United States Patent [19]
Wang

[11] Patent Number: 5,852,876
[45] Date of Patent: Dec. 29, 1998

[54] VEGETATION TRIMMER HEAD

[75] Inventor: Hung Te Wang, Palo Alto, Calif.

[73] Assignee: Sufix USA, Inc., High Point, N.C.

[21] Appl. No.: 831,650

[22] Filed: Apr. 9, 1997

[51] Int. Cl.[6] .................................................. A01D 34/73
[52] U.S. Cl. ................. 30/276; 30/347; 56/12.7
[58] Field of Search ......... 30/276, 347; 56/12.7, 56/255; D8/7, 8; D15/17

[56] References Cited

U.S. PATENT DOCUMENTS

| | | | |
|---|---|---|---|
| D. 280,903 | 10/1985 | Barbula | D15/16 |
| D. 299,484 | 1/1989 | Lee | D8/8 |
| 3,826,068 | 7/1974 | Ballas et al. | 56/12.7 |
| 3,831,278 | 8/1974 | Voglesonger | 30/276 |
| 3,859,776 | 1/1975 | Ballas et al. | 56/12.7 |
| 3,877,146 | 4/1975 | Pittinger | 30/276 |
| 4,047,299 | 9/1977 | Bair | 30/276 |
| 4,086,700 | 5/1978 | Inada | 30/276 |
| 4,107,841 | 8/1978 | Rebhun | 30/276 |
| 4,118,865 | 10/1978 | Jacyno et al. | 30/276 |
| 4,126,990 | 11/1978 | Fisher et al. | 56/295 |
| 4,202,094 | 5/1980 | Kalmar | 30/276 |
| 4,249,311 | 2/1981 | Inaga | 30/276 |
| 4,310,970 | 1/1982 | Evenson et al. | 30/276 |
| 4,356,686 | 11/1982 | Lessig, III | 56/295 |
| 4,406,065 | 9/1983 | Kohler | 30/347 |
| 4,685,279 | 8/1987 | Gullett | 56/12.7 |
| 4,790,071 | 12/1988 | Helmig et al. | 30/276 |
| 4,817,288 | 4/1989 | Hirose et al. | 30/276 |
| 4,856,194 | 8/1989 | Lee | 30/276 |
| 5,020,224 | 6/1991 | Haupt | 30/276 |
| 5,048,278 | 9/1991 | Jones et al. | 56/295 |
| 5,430,943 | 7/1995 | Lee | 30/347 |
| 5,491,962 | 2/1996 | Sutliff et al. | 56/12.7 |
| 5,617,636 | 4/1997 | Taggett et al. | 30/276 |
| 5,640,836 | 6/1997 | Lingerfelt | 56/255 |
| 5,659,964 | 8/1997 | Lawrence | 30/347 |

*Primary Examiner*—Hwei-siu Payer

[57] ABSTRACT

A durable one-piece vegetation trimmer head molded from a polymeric material provides ease in attachment and removal from standard vegetation trimmers. The trimmer head is fitted with three rotatable, rigid blades which extend during use. The trimmer head has a spool-like shape and includes a central channel having a conically-shaped opening along the bottom surface to assist the operator in attachment and removal of the trimmer head from the trimmer drive shaft. The preferred embodiment provides for threaded attachment to the trimmer drive shaft and in one alternate embodiment the trimmer head includes a pair of opposing spring grooves. In another alternate embodiment, various flexible trimmer line configurations can be fitted into a two-piece trimmer head which is threadably joined. A rigid trimmer blade is also disclosed which is formed from stainless steel.

12 Claims, 7 Drawing Sheets

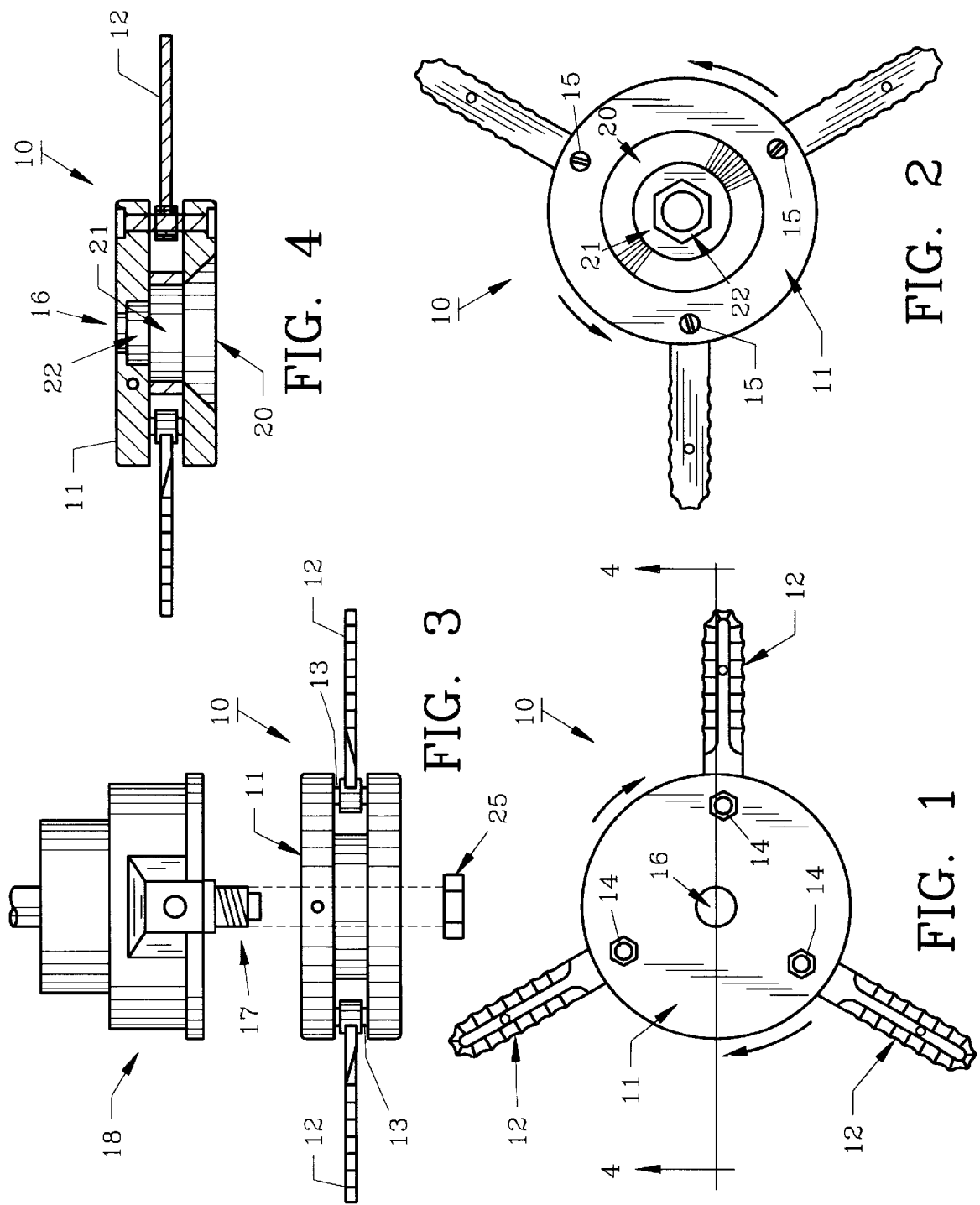

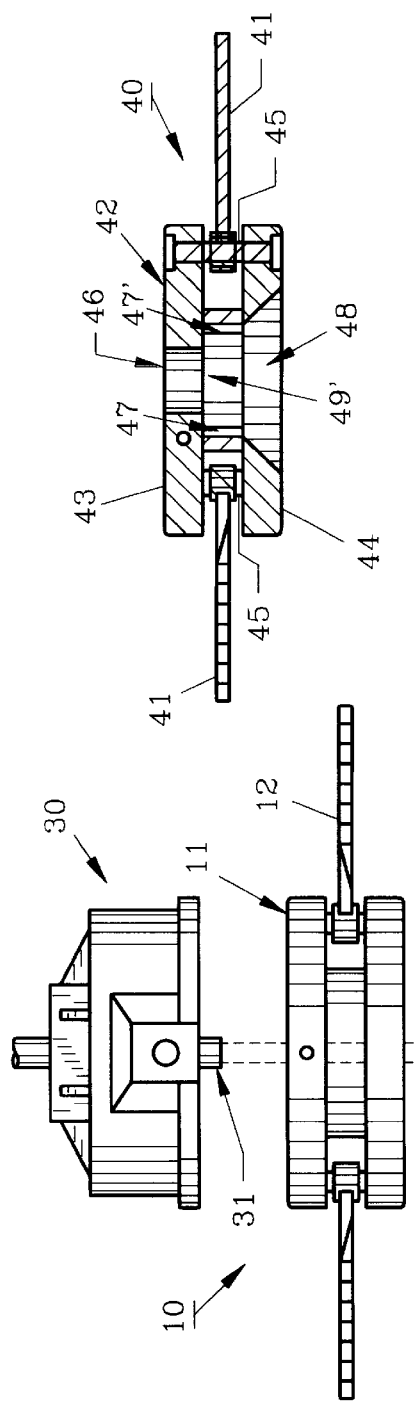
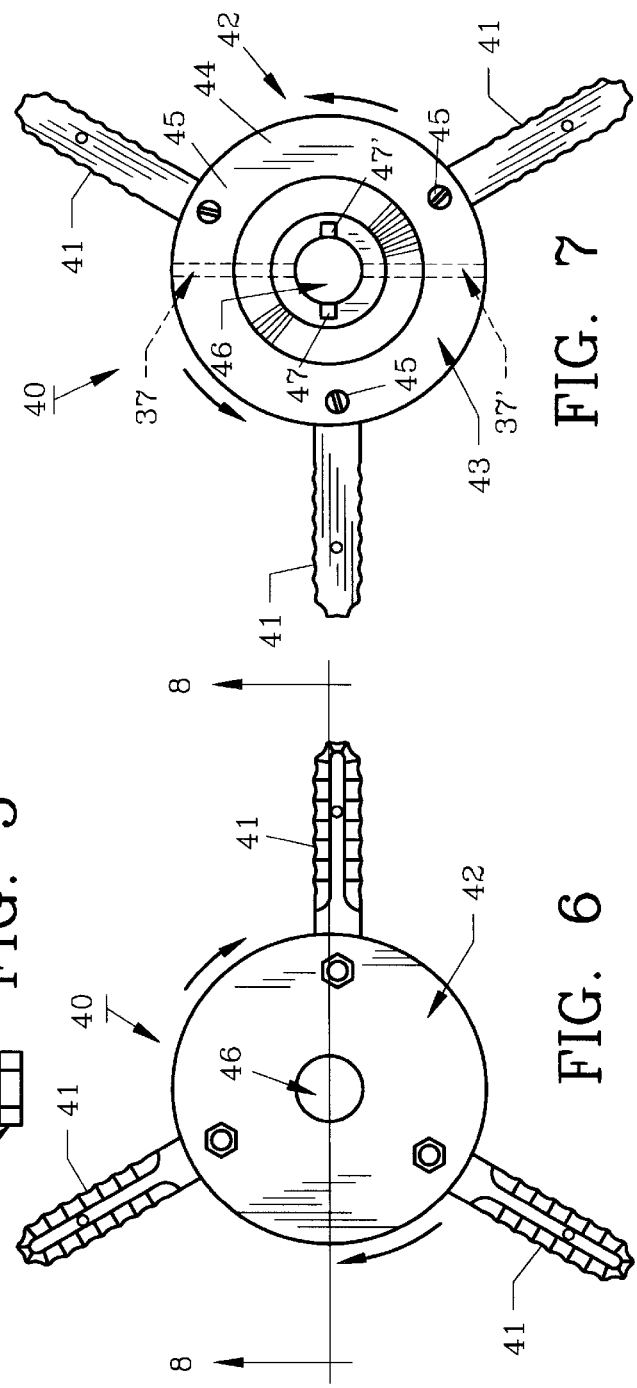

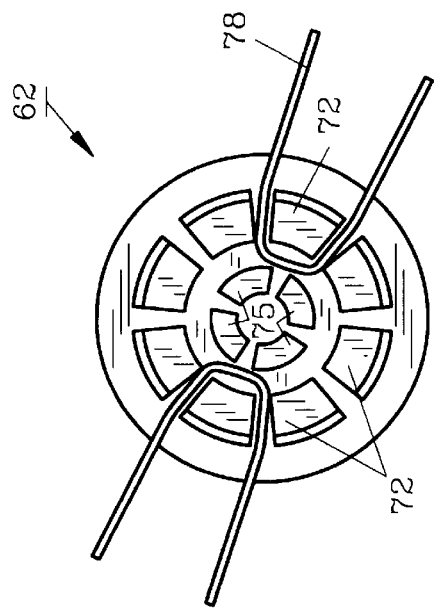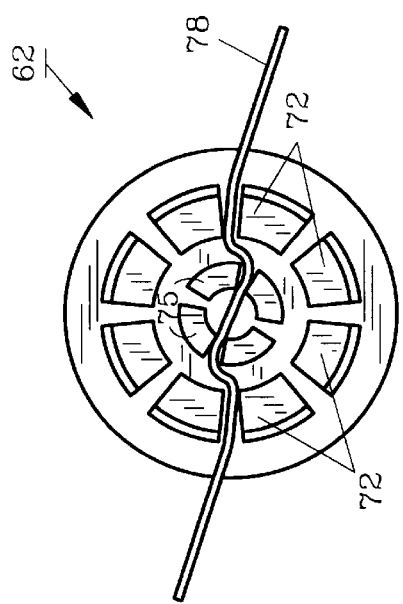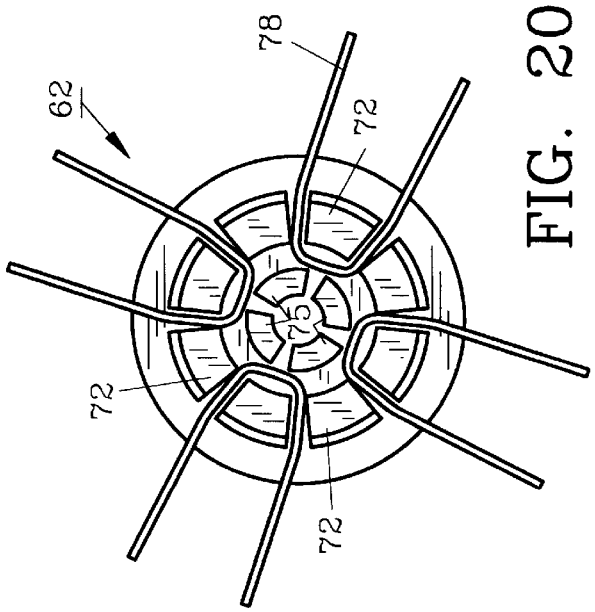

VEGETATION TRIMMER HEAD

BACKGROUND OF THE INVENTION

1. Field of the Invention

The invention herein pertains to trimmer heads as are fitted on conventional electric and gasoline powered vegetation trimmers and particularly pertains to trimmer heads which can be easily attached and removed from various trimmer makes and models that accommodate either rigid cutting blades or flexible line. A rigid stainless steel blade is also described.

2. Description of the Prior Art and Objectives of the Invention

Many vegetation trimmer heads have been devised in the past for both rigid, rotatable plastic blades and for flexible nylon line. Certain prior art trimmer heads are formed from plastic and are molded in one piece. Other conventional trimmer heads are formed in two halves and are bolted or otherwise joined with pivotable, rigid blades supported between the halves. Such standard trimmer heads are releasably connected to the drive shaft of conventional vegetation trimmers as are used by homeowners, maintenance personnel and others for grass and weed cutting. As standard rigid plastic blades often break during use, the need for a trimmer head accommodating easy blade replacement has arisen. Likewise, the need for an inexpensive trimmer head which is both durable and easy to attach to different types of drive shafts has grown in recent years, as more and more manufacturers of vegetation trimmers market their products. Also, standard rigid blades break or chip when thick, heavy weeds and underbrush are encountered.

Conventional flexible line-type trimmer heads often use reels to provide a single "end" whereby the line is fed through the head as needed. Other line-type trimmer heads utilize one or more lengths of flexible line to provide a plurality of ends for trimming.

Currently available trimmer heads have certain disadvantages in that some are molded from relatively thin plastics which readily crack or break. Other trimmer heads may fit only one type of drive shaft, requiring distributors to stock individual trimmer heads for each type and model of trimmer. Some trimmer heads which are readily available are difficult to assemble and attach to a selected drive shaft by unskilled persons. Standard flexible line-type trimmer heads often do not provide the versatility required, and cannot be modified to support different numbers of available ends for trimming.

Thus, based on the problems and disadvantages of prior art trimmer heads, the present invention was conceived and one of its objectives is to provide a trimmer head having a spool-like shape which is integrally molded from conventional plastic.

It is yet another objective of the present invention to provide a low cost trimmer head which will maintain a plurality of rotatable rigid plastic or metal blades.

It is still a further objective of the present invention to provide a trimmer head which can be attached to different types of trimmer drive shafts in a convenient, secure and easy manner.

It is also an objective of the present invention to produce a trimmer head having a central channel for reception of a trimmer drive shaft, the central channel including a conical portion, a cylindrical portion and a polygonal portion.

An additional objective of the present invention features a flexible line-type trimmer head which will allow the user to select a variety of line ends, depending on the density and type of vegetation to be trimmed.

Still another objective of the present invention is to present a rigid stainless steel blade for use on heavy vegetation.

Various other objectives and advantages of the present invention will become apparent to those skilled in the art as a more detailed description is set forth below.

SUMMARY OF THE INVENTION

The aforesaid and other objectives are realized by providing in one embodiment a trimmer head with a spool-like appearance integrally molded from a rigid, durable standard polymeric material. The spool supports a trio of substantially flat, rigid blades by threaded members which pass from the top surface to the bottom surface of the spool for convenience in blade replacement. To attach the spool to a conventional trimmer drive shaft, in the preferred embodiment, a nut or bolt can be used, depending on the specific shaft encountered. A central channel within the spool includes a large, conically-shaped opening along the bottom surface to assist in manipulation of the aforementioned nut or bolt fastener. A polygonal portion of the central channel grips the fastener and prevents rotation thereof. In an alternate embodiment of the invention the spool includes a pair of opposing vertical grooves which accommodate spring members used for latching a specific drive shaft to the trimmer head.

In another alternate embodiment of the invention a flexible line-type trimmer head is formed from a polymeric material for selection by the user of various numbers of line ends. The top and bottom of the trimmer head are threadably connected with line support posts therebetween for containing lengths of flexible line.

A preferred rigid stainless steel blade is available for heavy underbrush or thick, dense weeds. A series of slots formed in the blade shank and body reduces the blade weight.

BRIEF DESCRIPTION OF THE DRAWINGS

FIG. 1 illustrates a top plan view of the preferred form of the trimmer head removed from the trimmer drive shaft;

FIG. 2 shows a bottom plan view of the trimmer head as shown in FIG. 1;

FIG. 3 demonstrates the trimmer head of FIG. 1 exploded from a conventional trimmer drive shaft;

FIG. 4 shows a cross-sectional view along lines 4—4 of the trimmer head as seen in FIG. 1;

FIG. 5 depicts yet another standard trimmer drive shaft with the trimmer head and fastener exploded therefrom;

FIG. 6 pictures another embodiment of the trimmer head in a top plan view;

FIG. 7 presents a bottom plan view of the trimmer head as shown in FIG. 6;

FIG. 8 features a cross-sectional view of the embodiment of FIG. 6 along lines 8—8;

FIG. 18 demonstrates the bottom of the alternative embodiment of the trimmer head as shown in FIG. 10 with a flexible nylon trimmer line therein having two cutting ends;

FIG. 19 is another view of the bottom of the trimmer head as shown in FIG. 10 having four ends of flexible trimmer line;

FIG. 20 pictures the bottom of the trimmer head as shown in FIGS. 18 and 19 but with eight ends of flexible trimmer line;

DETAILED DESCRIPTION OF THE DRAWINGS AND OPERATION OF THE INVENTION

Figure 9:
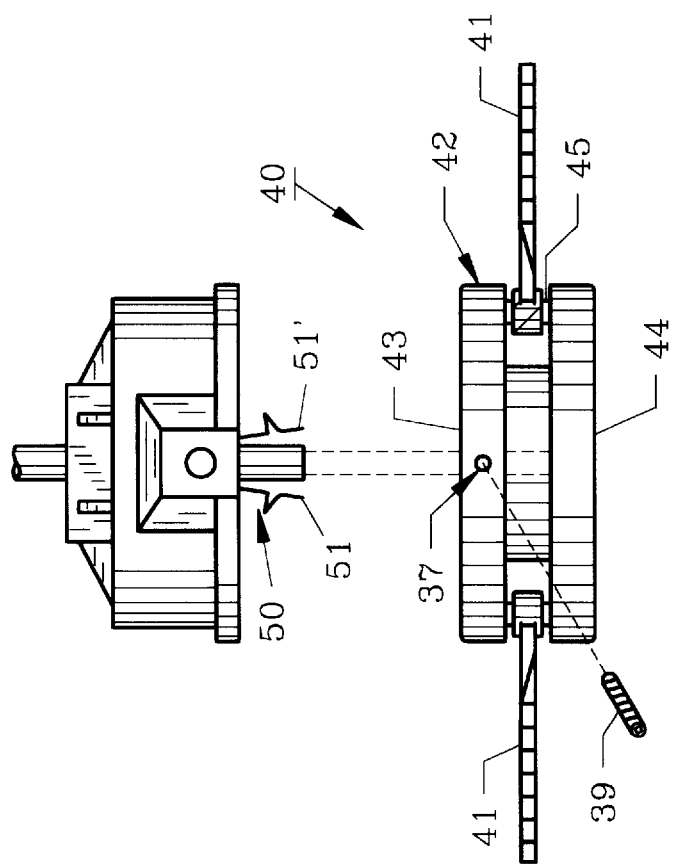
FIG. 9 demonstrates the trimmer head of FIG. 6 exploded from a conventional drive having a spring retainer.

For a better understanding of the invention and its operation, turning now to the drawings, FIGS. 1–5 demonstrate the preferred form of the invention suitable for different shaft attachment methods as will be explained in more detail below.

In FIG. 1, a top view of the preferred form of trimmer head 10 is shown including integrally molded plastic spool 11 which can be formed from a variety of desirable polymeric materials as are commercially available. Spool 11 supports a trio of rigid plastic blades 12 which are also standard in the trade. Blades 12 rotate about threaded posts 13 which are secured by nuts 14 (FIG. 1) atop spool 11. Said posts 13 each have a grooved head 15, along the bottom of spool 11 as shown in FIGS. 2. Spool 11 defines a central channel 16 for receiving drive shaft 17, which is externally threaded, of conventional vegetation trimmer 18 as seen in fragmented form in FIG. 3. Central channel 16 is composed of three portions, conically-shaped bottom portion 20, as shown in FIGS. 2 and 4, cylindrically-shaped middle portion 21 and geometrically-shaped top portion 22. Channel portions 20, 21 and 22 are contiguous to allow drive shaft 17, as shown in FIG. 3, to easily pass therethrough as needed. Conically-shaped portion 20 allows a tool or the operator's fingers to easily insert a fastener, such as nut 25, shown in FIG. 3, into polygonal portion 22. Conically-shaped portion 20 includes a narrow end, which is at least as wide as cylindrically-shaped portion 21, and a wide end which communicates with the bottom surface of spool 11. Polygonal portion 22 may have, for example, a hexagonal or octagonal shape to tightly secure a correspondingly shaped nut or bolt head to the drive shaft to prevent rotation thereof. Channel portion 22 may also have a square or other polygonal shape as desired, although a hexagonal shape is preferred. Cylindrical portion 21 of central channel 16 is cylindrical-shaped and is wider than geometrically-shaped portion 22, also to aid and assist the placement of a nut or other fastener onto shaft 17 or other drive shaft utilized. While three rigid plastic blades are shown supported by spool 11, one or more blades may be utilized as needed, although three blades are preferred.

In FIG. 5, trimmer 30 is shown in fragmented fashion with drive shaft 31. Drive shaft 31 is internally threaded to accommodate bolt 32. Bolt 32, like nut 25, has a hexagonal head which fits within hexagonally-shaped portion 22 of central channel 16, as shown in FIG. 4, to prevent rotation of bolt 32 as it threadably engages drive shaft 31.

A first alternate embodiment of vegetation trimmer head 40 is shown in FIGS. 6–9 having a trio of rotatable plastic blades 41. Trimmer head 40 includes integrally formed polymeric spool 42 as seen in cross-section in FIG. 8 and, like spool 11, includes central channel 46 which extends from top outer surface 43 of spool 42 to bottom outer surface 44, as shown in FIGS. 8 and 9. FIG. 7 demonstrates threaded posts 45 which pass through spool 42, as also seen in FIGS. 8 and 9 to rotatably retain rigid cutting blades 41 thereto. A washer is fitted between blades 41 and posts 45 as seen in FIG. 8 to allow blades 41 to freely rotate. Conventional drive shaft 50 as shown in FIG. 9 includes a pair of spring retainers 51, 51'. Central channel 46 of trimmer head 40 accommodates spring members 51, 51' by a pair of rectangularly-shaped grooves 47, 47', as depicted in FIGS. 7 and 8. Grooves 47, 47' allow drive shaft 50 to be "locked" into central channel 46 by spring retainers 51, 51'. Conically-shaped portion 48 of central channel 46 allows the operator to grasp the ends of spring retainers 51, 51' to release shaft 50 from spool 42 as needed. As also shown in FIG. 8, central channel 46 includes conical portion 48 and middle cylindrical portion 49', which is in communication with rectangularly-shaped grooves 47, 47'. To insure stability of trimmer head 40 on drive shaft 50, threaded locking channels 37, 37' are seen in FIG. 7. In FIG. 9, threaded member 39 is exploded from channel 37. In use, threaded member 39 is tightened with an Allen wrench into channel 37 where it frictionally abuts drive shaft 50. An additional threaded member is tightened into channel 37'.

Figure 13:
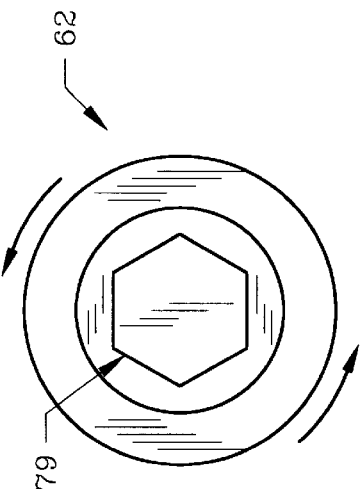
FIG. 13 features a bottom view of the bottom of the trimmer head as shown in FIG. 10 along lines 13—13.
Figure 14:
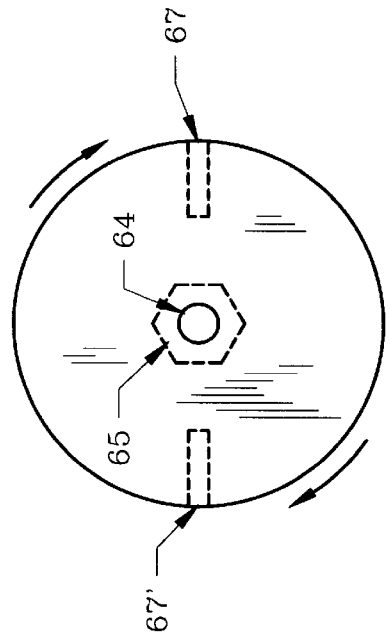
FIG. 14 illustrates a top view of the top of the trimmer head as shown in FIG. 10 along lines 14—14.
Figure 10:
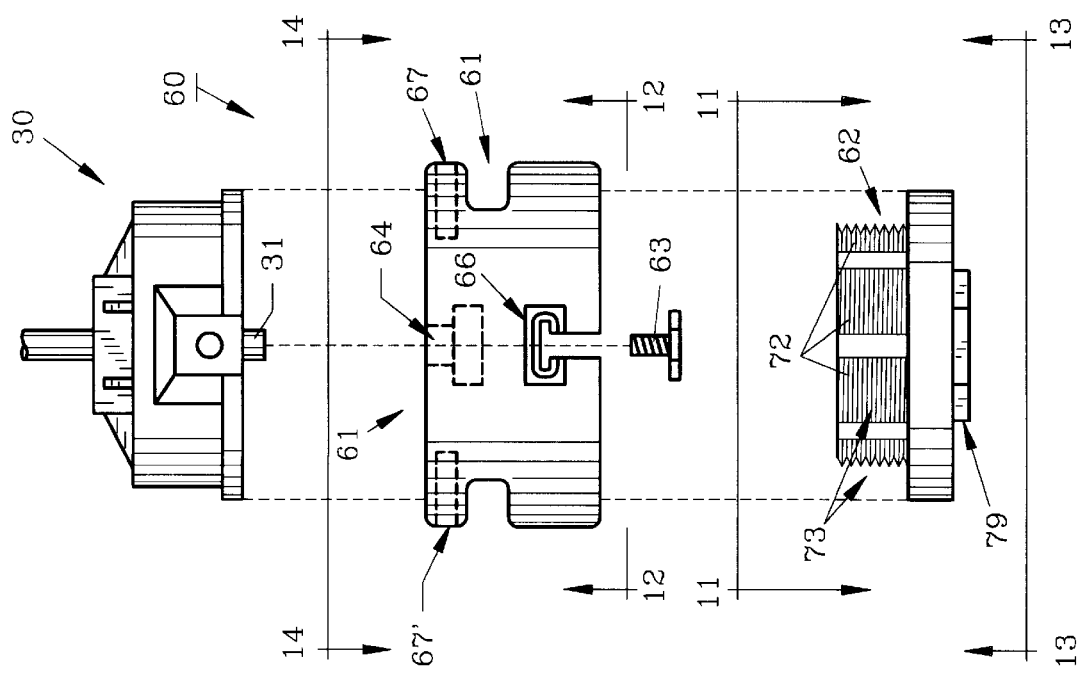
FIG. 10 illustrates another alternative of a two piece embodiment of the invention for use with flexible trimmer line, exploded from the trimmer drive shaft.
Figure 11:
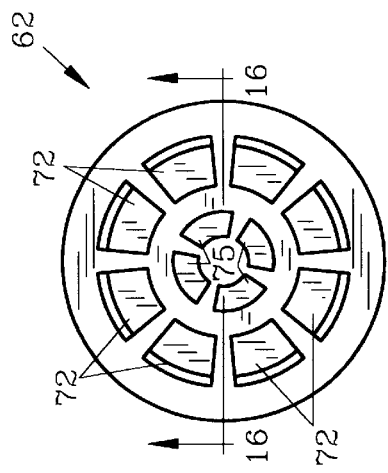
FIG. 11 shows a top plan view of the bottom of the trimmer head of FIG. 10 along lines 11—11.
Figure 16:
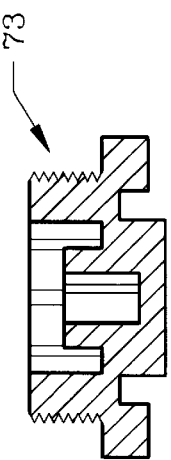
FIG. 16 is a cross-sectional view of the bottom of the trimmer head as shown in FIG. 11 along lines 16—16.

Another alternative embodiment of the invention is shown in FIGS. 10–20 for use with conventional flexible trimmer line as formed from nylon or other suitable materials. As seen in FIG. 10, trimmer head 60, includes a top 61 and a bottom 62, for joining to trimmer 30 (shown in fragmented fashion) having drive shaft 31 as earlier described. Trimmer head 60 can be molded of plastics or other suitable material having the strength and durability required. Top 61 is attached to trimmer 30 by bolt 63. Drive shaft 31 passes through channel 64 as shown in FIG. 14 and bolt 63 is threadably received within interiorly threaded shaft 31. To prevent the head of bolt 63 from turning and loosening, channel 64, as shown in FIG. 14, includes a hexagonal portion 65, as seen in FIG. 14, for receiving the head of bolt 63. Hexagonal portion 65 is configured to the contour of the head of bolt 63 and will not allow bolt 63 to turn. Eyelet 66 forms an opening on top 61 for flexible trimmer line to exit. A plurality of eyelets 66 are positioned on top 61 as desired.

Figure 17:
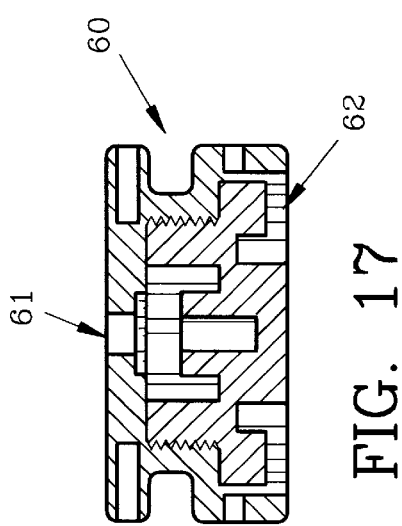
FIG. 17 is a cross-sectional view of the trimmer head as shown in FIG. 10 assembled, but removed from the trimmer shaft.

Thus, with top 61 of trimmer head 60 securely fastened by bolt 63 to shaft 31, bottom 62 can be then threadably attached to top 61 as shown in cross-section in FIG. 17. Bottom 62 can be manually rotated and tightened onto top 61. If top 61 and bottom 62 become frozen or jammed, cylindrical channels 67, 67' (FIG. 14) in top 61 will allow a tool such as a screwdriver, or other elongated instrument, to be placed therein to obtain greater torque while turning. Hexagon-shaped projection 79 can be held and turned with a socket wrench or other tool as needed during assembly or disassembly as seen in FIGS. 10 and 13.

Figure 12:
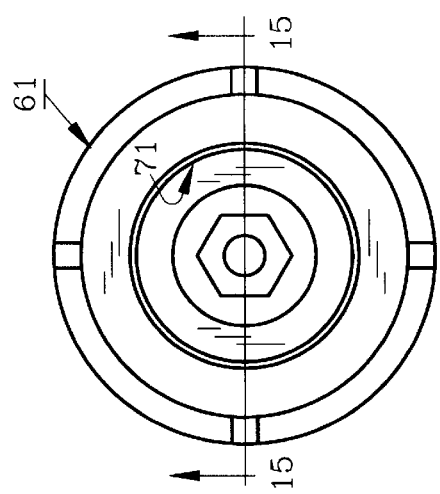
FIG. 12 presents a bottom plan view of the top of the trimmer head of FIG. 10 along lines 12—12.
Figure 15:
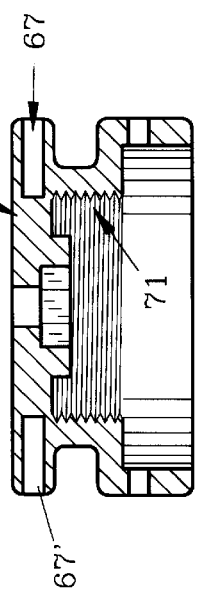
FIG. 15 is a cross-sectional view of the top of the trimmer head, as shown in FIG. 12 along lines 15—15.

As seen in FIG. 12, top 61 is threaded along inside surface 71. Outside surface 73 of bottom 62 is likewise threaded for engaging threaded surface 71 of top 61 (see FIG. 16). Thus, threaded surfaces 73 and 71 engage to secure top 61 to bottom 62 to form trimmer head 60 (FIG. 17). As further shown in FIG. 11, bottom 62 includes a series of polygonal-shaped inner posts 75 which form a concentric circle with polygonal-shaped outer threaded posts 72. The polygonal shape describes the posts' cross-sectional or top configuration. Inner posts 75 are slightly out of phase (rotated) from outer posts 72 to prevent linear trimmer line channel formation from outer posts 72 past inner posts 75, as will be explained in more detail below.

In FIGS. 18, 19 and 20 various flexible trimmer lines such as conventional nylon lines are seen in different arrangements on bottom 62. For example, in relatively light vegetation, a two-end configuration may be desirable as shown in FIG. 18, whereas in FIG. 20, an eight-end configuration may be more useful for heavy, dense vegetation. Trimmer line 78 can be cut to any desired length and can be placed around posts 72, 75 as shown. As posts 72 and 75 are out of phase, flexible line 78 must be bent and contorted for positioning on bottom 62. This bending action provides a tight, frictional engagement of trimmer line 78 and prevents trimmer line 78 from flying out of trimmer head 60, even under the high centrifugal forces generated by the rapid rotation of trimmer shaft 31 during normal vegetation removal. Thus, as seen in FIGS. 18, 19 and 20, trimmer head 60 can be extremely versatile and can be quickly changed from a two-end flexible trimmer line to an eight-end flexible trimmer head with relative ease and convenience, even by those only slightly skillful.

Figure 22:
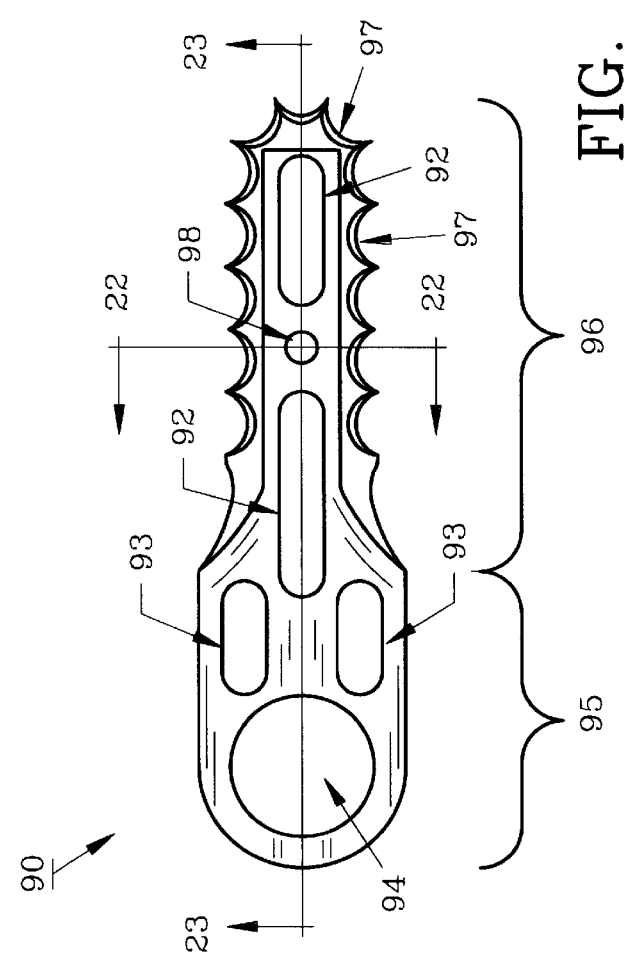
FIG. 22 is a cross-sectional view of the blade as seen along lines 22—22 of FIG. 21.
Figure 23:
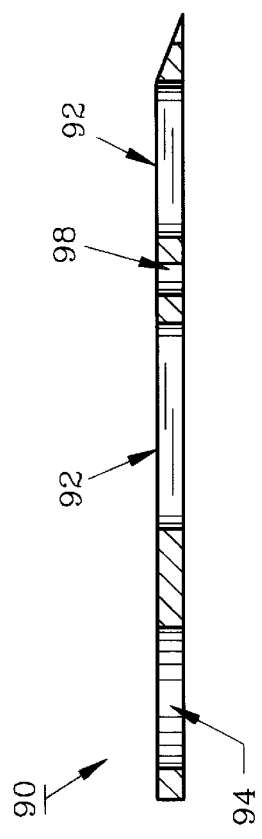
FIG. 23 is a cross-sectional view of the blade of FIG. 21 seen along lines 23—23 therein.
Figure 21:
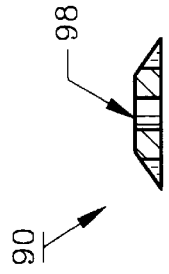
FIG. 21 shows a top enlarged view of the preferred rigid blade of the invention.

The preferred rigid blade such as for use with trimmer head 10, as shown in FIGS. 1 and 2 or trimmer head 40 as seen in FIGS. 6 and 7, is depicted in FIGS. 21–23. Blade 90, as shown in FIG. 21, is formed from stainless steel and has a thickness of 2–4 mm, preferably of 3 mm. Blade 90, as shown in cross-section in FIGS. 22 and 23, is useful for cutting thick weeds and underbrush, due to its rigid, durable nature. Blade 90 includes a series of weight-reduction slots such as slots 92 and 93. Axle aperture 94 in shank 95 provides for easy, secure mounting on a selected trimmer head. Locking aperture 98 is useful for locking blade 90 in a dormant position on the trimmer head, as explained in detail in my earlier co-pending patent application Ser. No. 08/736,708.

As further seen in FIG. 21, body 96 defines a plurality of cutting edges 97 therearound for cutting weeds, plants, underbrush and the like, and due to the hardness of stainless steel, blade 90 will remain sharp after many hours of adverse use.

The illustrations and examples provided herein are for explanatory purposes and are not intended to limit the scope of the appended claims.

I claim:

1. A vegetation trimmer head in combination with a trimmer shaft attachment, said trimmer head comprising: a spool, said spool having a top surface and a bottom surface, said spool defining a central channel, said central channel for receiving a trimmer drive shaft, said spool defining said central channel with:
   a) a conically-shaped portion, said conically-shaped portion including a wide end;
   b) a cylindrically-shaped portion, and
   c) a geometrically-shaped portion,
said conically-shaped portion proximate said spool bottom surface, said trimmer shaft attachment contained within said geometrically-shaped portion to maintain said spool on the trimmer drive shaft said cylindrically-shaped portion wider than said geometrically-shaped portion, said conically-shaped portion allowing easy insertion of said trimmer shaft attachment therethrough from said wide end of said conically-shaped portion.

2. The combination of claim 1 wherein said trimmer shaft attachment comprises a bolt.

3. The combination of claim 1 wherein said trimmer shaft attachment comprises a nut.

4. The combination of claim 1 wherein said trimmer shaft attachment comprises a spring retainer.

5. The combination of claim 1 wherein said spool is integrally molded from a polymeric material.

6. The combination of claim 1 further comprising a plurality of rigid blades, said rigid blades rotatably attached to said spool.

7. A vegetation trimmer head comprising: a spool, said spool defining a central channel, said channel extending from the top surface of said spool to the bottom surface thereof, said spool defining said channel with
   a) a conically-shaped portion,
   b) a cylindrically-shaped portion, and
   c) a geometrically-shaped portion,
said conically-shaped portion proximate said spool bottom surface, said geometrically-shaped portion proximate said spool top surface to retain a fastener and to prevent fastener rotation thereof, said cylindrically-shaped portion wider than said geometrically-shaped portion.

8. The vegetation trimmer head of claim 7 wherein said spool is integrally formed.

9. The vegetation trimmer head of claim 7 is molded from a polymeric material.

10. The vegetation trimmer head of claim 7 further comprising a plurality of rigid blades, said blades rotatably attached to said spool.

11. The vegetation trimmer head of claim 10 further comprising means to rotatably retain said blades, said rotatable retaining means attached to said spool.

12. The vegetation trimmer head of claim 7 wherein said geometrically-shaped portion is polygonal.

* * * * *